(12) United States Patent
Miller

(10) Patent No.: US 6,185,154 B1
(45) Date of Patent: Feb. 6, 2001

(54) LOW SURFACE FRICTION ACOUSTIC ENVELOPE FOR TOWED SONAR ARRAYS

(75) Inventor: Howard A. Miller, Encinitas, CA (US)

(73) Assignee: The United States of America as represented by the Secretary of the Navy, Washington, DC (US)

(*) Notice: Under 35 U.S.C. 154(b), the term of this patent shall be extended for 0 days.

(21) Appl. No.: 09/339,522

(22) Filed: Jun. 24, 1999

(51) Int. Cl.$^7$ .............................. G01V 1/38; H04R 1/44
(52) U.S. Cl. ....................... 367/130; 367/20; 367/106; 174/101.5
(58) Field of Search .................. 367/20, 106, 130, 367/131, 134, 153, 154, 188; 174/101.5

(56) References Cited

U.S. PATENT DOCUMENTS

| | | |
|---|---|---|
| 4,090,168 | 5/1978 | Miller et al. . |
| 4,180,103 | 12/1979 | Mollere . |
| 4,296,481 | 10/1981 | Weiss . |
| 4,402,069 | 8/1983 | Miller et al. . |
| 4,410,012 | * 10/1983 | Redding et al. ................ 138/121 |
| 4,679,179 | 7/1987 | Lally . |
| 4,685,090 | * 8/1987 | Krevor ................................ 367/20 |
| 4,775,962 | 10/1988 | Keckler et al. . |
| 5,228,005 | * 7/1993 | Belland ............................... 367/20 |
| 5,272,679 | 12/1993 | Carpenter . |
| 5,643,516 | * 7/1997 | Raza et al. ...................... 264/127 |

* cited by examiner

Primary Examiner—Ian J. Lobo
(74) Attorney, Agent, or Firm—Harvey Fendelman; Michael A. Kagan; Peter A. Lipovsky

(57) ABSTRACT

A low friction surface is provided to hose-shaped acoustic envelopes for towed sonar arrays. The low friction surface permits multiple envelopes that are in intimate, parallel contact or that are crossed-over one another, to slide easily relative to one another, enhancing their deployment. The low friction surface is accomplished by blending particles of a low friction material with a base material. The mixture is heat extruded into pellets and the pellets are heat extruded into a hose of desired size. The exterior surface of the resulting hose is then subject to axially aligned abrasion to both expose the particles close to the exterior surface of the hose, and to create axially aligned micro-grooves in this surface. The micro-grooves allow water to enter and lubricate the boundary that is present, which is typically either another hose surface or the metal or other surface of an array deployment vehicle. The envelope material further provides improved damping of array hydrodynamic self noise for certain acoustic environments.

14 Claims, 6 Drawing Sheets

| SURFACE TREATMENT | FILLER (1) | WET OR DRY | STATIC | DYNAMIC |
|---|---|---|---|---|
| ESTANE 58881 | | | | |
| NONE | NONE | W | 1.9 | 1.8 |
| NONE | NONE | D | 2.6 | 2.4 |
| 400 GRIT | NONE | W | 1.9 | 1.8 |
| NONE | 5 PHR | D | >2.5 | >2.5 |
| 150 GRIT | 5 PHR | D | 1.4 | 1.5 |
| 240 GRIT | 5 PHR | D | 1.3 | 1.3 |
| 400 GRIT | 5 PHR | D | 0.91 | 1.1 |
| NONE | 10 PHR | D | >2.5 | >2.5 |
| 150 GRIT | 10 PHR | D | 1.4 | 1.4 |
| 240 GRIT | 10 PHR | D | 1.2 | 1.3 |
| 400 GRIT | 10 PHR | D | 0.61 | 0.57 |
| NONE | 20 PHR | D | >2.5 | >2.5 |
| 150 GRIT | 20 PHR | D | 1.2 | 1.2 |
| 240 GRIT | 20 PHR | D | 1.0 | 1.1 |
| 400 GRIT | 20 PHR | D | 0.48 | 0.40 |

(1) FILLER IS TEFLON, DuPONT FLUOROADDITIVE, TYPE MP 1300, 8-15 MICRON AVERAGE PARTICLE SIZE.

| SURFACE TREATMENT | FILLER (1) | WET OR DRY | STATIC | DYNAMIC |
|---|---|---|---|---|
| NONE | NONE | ESTANE 58881 W | 1.9 | 1.8 |
| NONE | NONE | D | 2.6 | 2.4 |
| 400 GRIT | NONE | W | 1.9 | 1.8 |
| NONE | 5 PHR | D | >2.5 | >2.5 |
| 150 GRIT | 5 PHR | D | 1.4 | 1.5 |
| 240 GRIT | 5 PHR | D | 1.3 | 1.3 |
| 400 GRIT | 5 PHR | D | 0.91 | 1.1 |
| NONE | 10 PHR | D | >2.5 | >2.5 |
| 150 GRIT | 10 PHR | D | 1.4 | 1.4 |
| 240 GRIT | 10 PHR | D | 1.2 | 1.3 |
| 400 GRIT | 10 PHR | D | 0.61 | 0.57 |
| NONE | 20 PHR | D | >2.5 | >2.5 |
| 150 GRIT | 20 PHR | D | 1.2 | 1.2 |
| 240 GRIT | 20 PHR | D | 1.0 | 1.1 |
| 400 GRIT | 20 PHR | D | 0.48 | 0.40 |

(1) FILLER IS TEFLON, DuPONT FLUOROADDITIVE, TYPE MP 1300, 8-15 MICRON AVERAGE PARTICLE SIZE.

FIG. 4

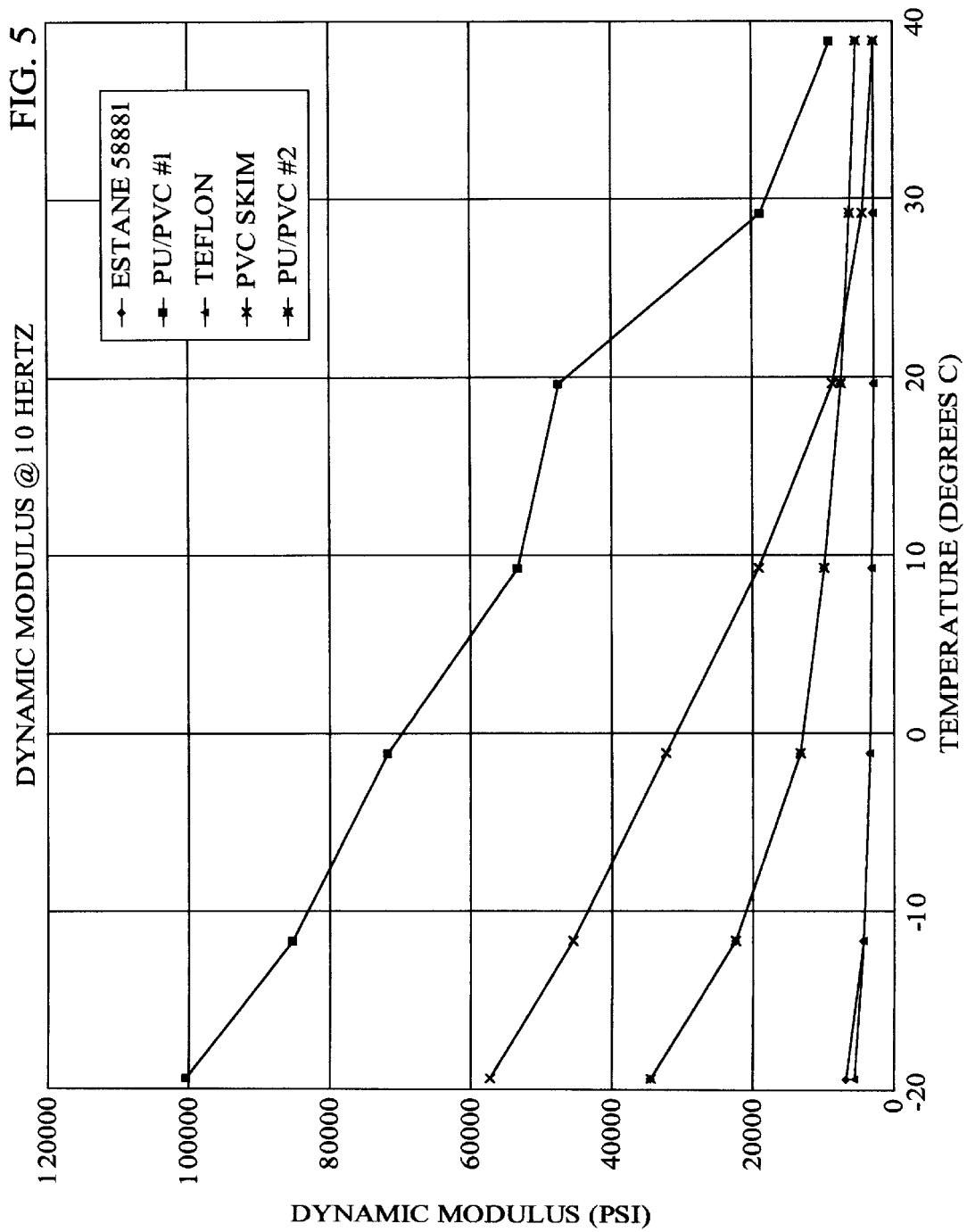

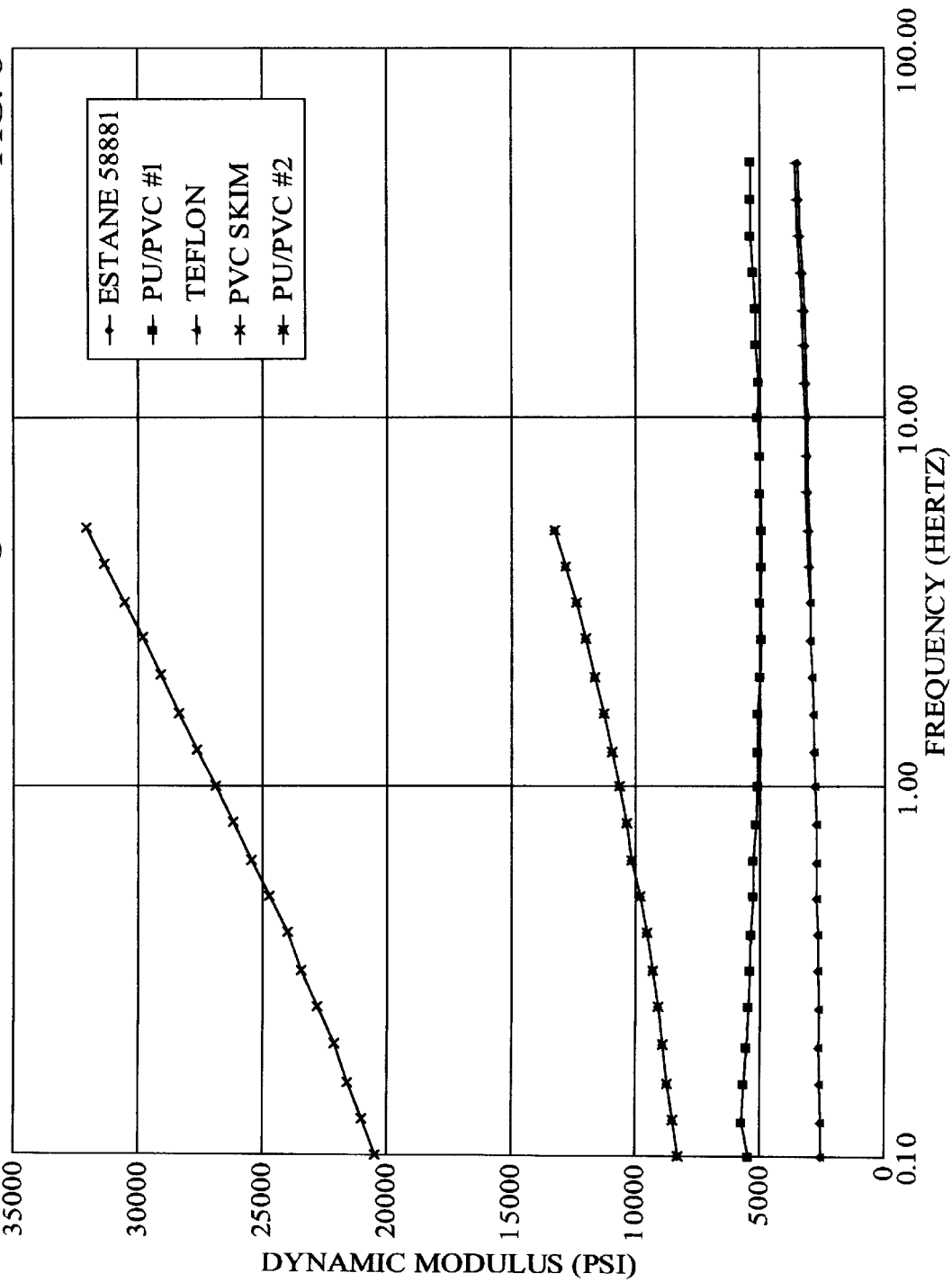

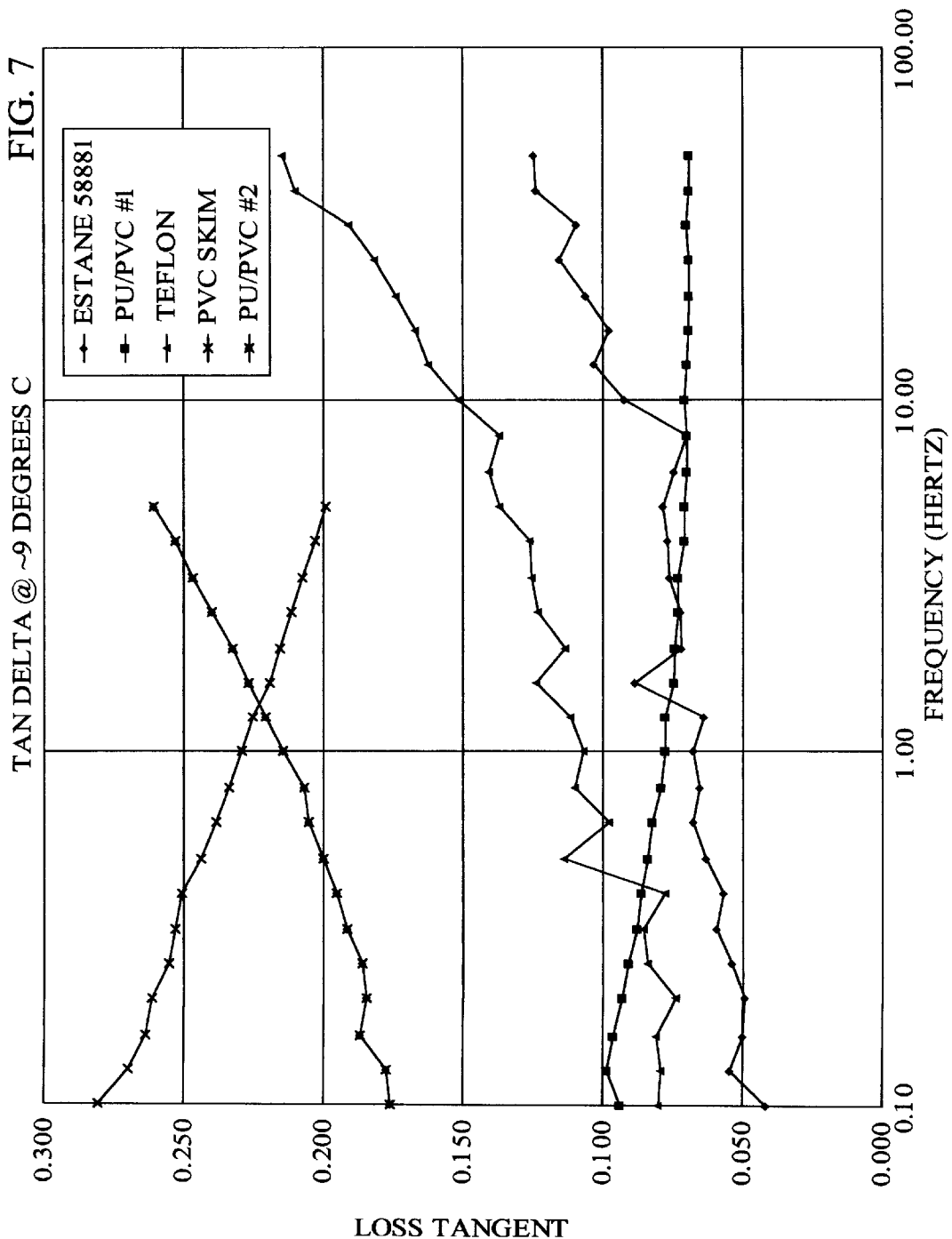

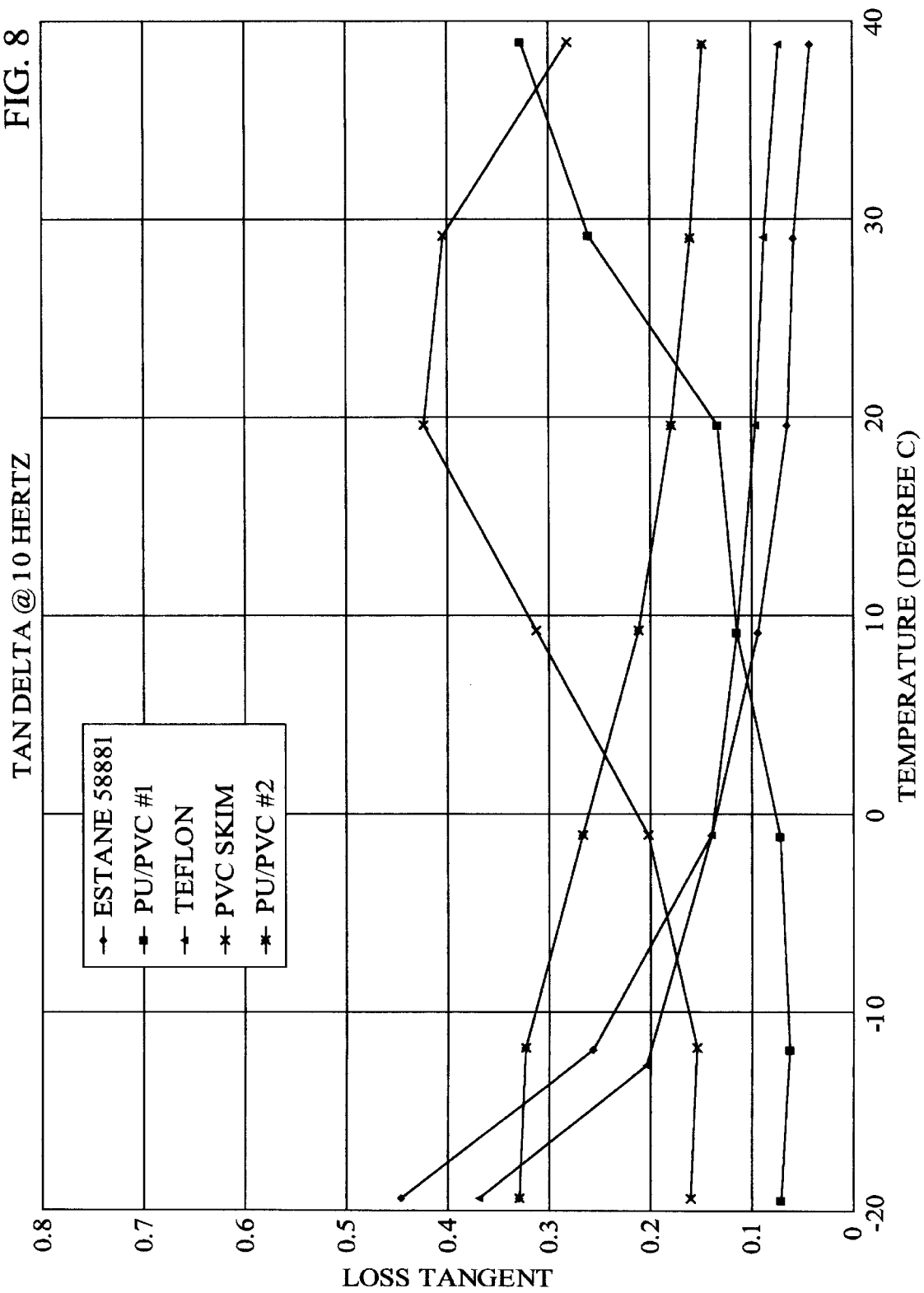

LOW SURFACE FRICTION ACOUSTIC ENVELOPE FOR TOWED SONAR ARRAYS

BACKGROUND OF THE INVENTION

This invention relates to towed sonar arrays, and more particularly, but without limitation thereto, to the jacket that surrounds the acoustic equipment of such an array.

Towed sonar line arrays are deployed in the ocean for military and commercial purposes. These line arrays most commonly use thermoplastic polyurethane (TPU) in a hose-shaped envelope (known also in this art simply as a "hose"). The hose-shaped envelope contains the hydrophone elements and accompanying transmission lines of the acoustic system.

In recent years, the value of towing multiple lines at the same time has become apparent. This technique has introduced problems in the deployment of the arrays. The problems become apparent when the relativity high surface-friction TPU hoses cross over or lay in parallel contact with one another. In these circumstances, deployment can become impossible or can result in tangling of the hoses.

In military applications, some submarines have used a tube adjacent to their hull to store a single sonar line array. To deploy this array, seawater is pumped into the forward-most end of the stowage tube, and the array is "flushed" out the aft-end of the tube along with seawater. An early attempt to replace this single line array with several smaller ones was not successful because the multiple lines, unable to move relative to one another due to the TPU hose surface friction, would lock up in the bends of the stowage tube and could not be flushed.

The geophysical (seismic) industry now tows multiple-line arrays in their search for oil. This industry has suffered problems deploying the multiple-line arrays from surface ships due to TPU hose surface friction. Current solutions in use by the oil industry are (1) adding an outer layer of polyvinyl chloride (PVC) to the TPU hose or (2) blending TPU and PVC. These combinations resulted in hose surface friction sufficiently lower than that of TPU, so that deploying multiple line arrays using typical geophysical boat deployment techniques (different from that of the submarine), is now relatively free of problems related to hose surface friction. The materials of the geophysical blends, while acceptable for their intended purposes, provide over-all performance that is less than desired for certain applications.

There is thus a need for an acoustic envelope that provides low-friction surface characteristics, while, at the same time, provides improved damping of hydrodynamically generated, array self-noise.

SUMMARY OF THE INVENTION

The invention provides a low friction surface to a hose-shaped acoustic envelope of a towed sonar array. The low friction envelope permits multiple envelopes that are in intimate, parallel contact or that arc crossed-over one another, to slide easily relative to one another, enhancing their deployment.

The hose is of a material that also provides damping of array self-noise, such as that caused by turbulent fluid flow along the hose and/or by the vibration or "strumming" of the tow cable of the array.

According to the invention, particles of a low friction material are blended with a common hose material, such as TPU. The mixture is then heat extruded into pellets and the pellets are heat extruded into a hose of desired size. The exterior surface of the resulting hose is then subject to axially aligned abrasion to both expose the particles close to the exterior surface of the hose, and to create axially aligned micro-grooves in this surface. The micro-grooves enhance the low friction performance of the envelope under both dry and wet conditions. Under wet conditions, the grooves allow water to enter and lubricate the boundary that is present. Typically these boundaries are either another hose surface or the metal or other surface of an array deployment vehicle.

An object of the invention is to provide an improved acoustic envelope for towed sonar arrays.

Another object of this invention is to provide an improved acoustic envelope for towed sonar arrays in which the envelope slides easily over similar envelopes and over acoustic array deployment surfaces.

Yet another object of this invention is to provide an improved acoustic envelope for towed sonar arrays that dampens array self noise.

These and other objects of the invention will become apparent from the following specification and claims when taken in conjunction with the accompanying drawings.

BRIEF DESCRIPTION OF THE DRAWINGS

FIG. 4 is a table illustrating friction characteristics of the invention.

FIG. 5 shows the dynamic modulus of various hose materials, including the invention, at ten Hertz for various temperatures.

FIG. 6 shows the dynamic modulus of various hose materials, including the invention, at approximately nine degrees Centigrade for various frequencies.

FIG. 7 shows the Tan Delta damping factor of various hose materials, including the invention, at approximately nine degrees Centigrade for various frequencies.

FIG. 8 shows the Tan Delta damping factor of various hose materials, including the invention, at ten Hertz for various temperatures.

DESCRIPTION OF THE PREFERRED EMBODIMENT

The invention is a hose-shaped envelope, also referred to herein as simply a "hose", which can be used to contain the acoustic equipment of a towed sonar line array. The make-up of the hose includes a base material, such as thermoplastic polyurethane (TPU), that is modified by the addition of many tiny particles of a low friction material such as TEFLON (Trademark), otherwise known as polytetrafluoroethylene. Axially oriented micro-grooves are formed in the normally smooth exterior surface of the hose to expose the low friction material and also to allow entry of water for exterior surface boundary lubrication.

Figure 1:
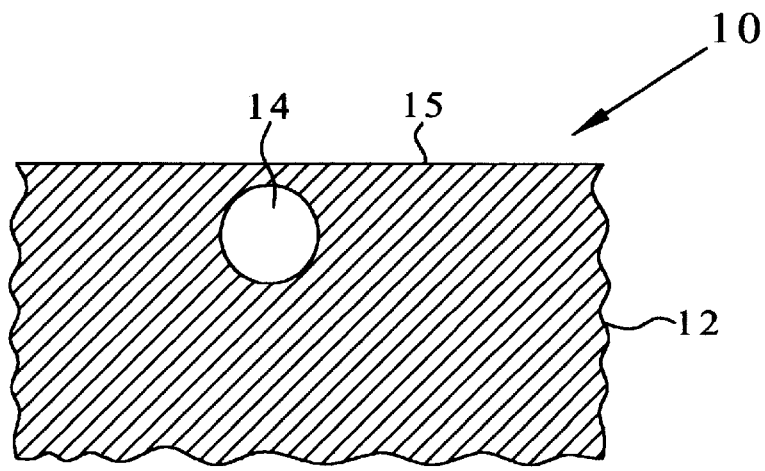
FIG. 1 illustrates an axially aligned perspective of a cut-out, cross-section of the invention in which a low friction particle is shown beneath the exterior surface of the hose.

Referring to FIG. 1, a rudimentary sketch of a cut-out, cross-sectional view of hose 10 of the invention is shown from a perspective that is in-line with the longitudinal axis of the hose. Hose 10 is a blend of a base material 12 and low-friction particles such as that shown at 14. An example of a hose material process and mixture found suitable for use in underwater acoustic array applications includes a powdered form of TEFLON, such as Dupont Teflon fluoroadditive Type MP-1300, that is blended with small pellets of the TPU, such as B. F. Goodrich Estane 58881. In this instance the particles of TEFLON had an average particle size of 8–15 microns. Typical heat extruding techniques were then used to smoothly heat extrude a simple rod-shaped form of the mix which was then chopped into small pellets of approximately ⅛ inch diameter and 1/8 inch length. This preliminary extrusion is important in assuring a good dispersion of the TEFLON particles within the finished hose.

The TEFLON blended TPU pellets were then used to heat extrude a hose-shaped envelope of a desired size, typically running from an outer diameter of 2 to 10 centimeters with a wall thickness of 2 to 8 millimeters or 5 to 15 percent of the hose outer diameter. Because of the nature of plastic material flow during the preliminary extrusion process, the surface of the hose will be essentially pure TPU and will not yet have desirable low friction characteristics (see FIG. 1).

To meet desired friction requirements, outer surface 15 of the hose is sanded with a fine grade abrasive to expose the low friction particles embedded near the surface of the hose. The sanding is done in the hose axis direction and forms axially aligned micro-grooves 16 in the hose outer surface (see FIG. 2). Once the surface is prepared, the hose shaped envelope is ready to be fabricated into a sonar line array as a substitution for standard array hose.

Figure 2:
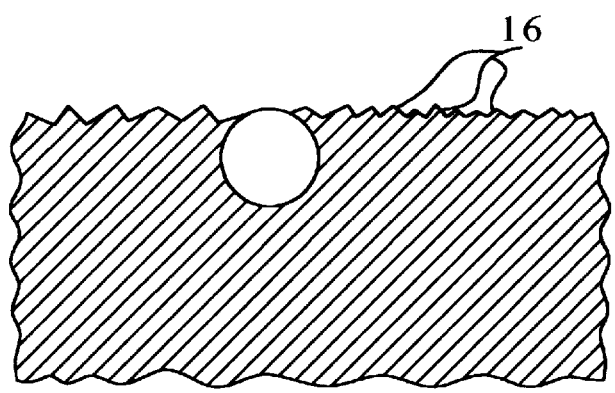
FIG. 2 shows an axially aligned perspective of a cut-out, cross-section of the invention in which microgrooves have been worked into the exterior surface of the hose to expose low-friction particles.
Figure 3:
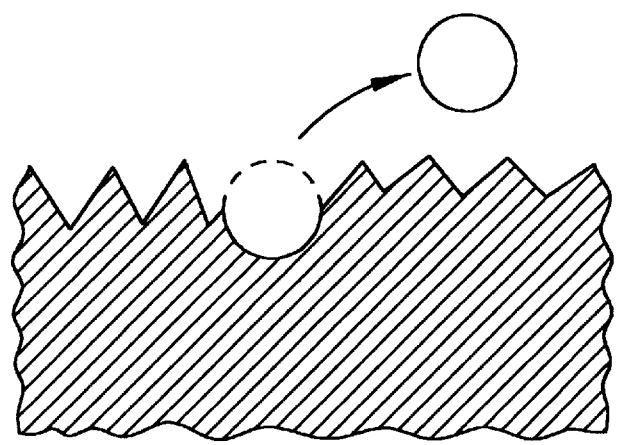
FIG. 3 illustrates a further axially aligned perspective of a cut-out, cross-section of the invention in which coarse grooves have resulted in removal of low-friction particles close to the hose exterior surface.

These micro-grooves enhance friction performance by allowing water to enter and lubricate the boundary present— typically either another hose surface or an array deployment surface. Surface preparation using fine grit paper, e.g. 400, has been found to produce a lower friction surface than do coarser grits. This is believed due to the relative size of the cut versus the TEFLON particle size—small cuts only remove the TPU surface material to expose a portion of each particle, as shown in FIG. 2, while larger cuts result in loss of the particles from the surface, FIG. 3.

FIG. 4 is a table illustrating the friction characteristics of wet and dry static and dynamic friction tests conducted on unaltered Estane 58881 and Estane 58881 altered by way of different combinations of abrasion and low friction particle proportions. The table illustrates use of abrasives ranging from 150 to 400 grit, however it is believed that even grits finer than 400 could be used to provide acceptable performance of the invention. In the table, PHR represent parts weight of low friction material per hundred parts weight of resin, so that, for example, a PHR of 20 equates with the combination of 20 pounds TEFLON per 100 pounds urethane. The tests were conducted by placing a test specimen under a sled weighing 840 grams. The static friction as used in the table is defined as the force required to start the sled, divided by the sled weight. The dynamic friction is defined as the force required to move the sled at 2 inches per second divided by the sled weight. Wet tests were conducted by placing the sled in a puddle of water during the run.

Besides providing a low friction acoustic envelope, the invention also provides desirable damping of array self noise. Referring now to FIGS. 5–8, the dynamic modulus and Tan Delta damping factor characteristics of the invention are shown as compared to a variety of typical hose materials. In these graphs, the invention, identified as "TEFLON" is compared to unaltered Estane 58881, two commercially available geophysical acoustic array hoses, identified as PU/PVC #'s 1 and 2 and finally to a geophysical hose comprising a TPU understructure with an exterior coating of polyvinyl chloride, identified as the "PVC Skim" hose. As can be seen from these figures, specific applications of the invention provide superior damping characteristics compared to those of the other tested materials.

The material of the invention provides a surface having low friction compared to other candidate acoustic envelope materials. It does so while providing superior self-noise damping in certain operating environments. These goals have been accomplished by blending low friction particulates with a common acoustic envelope material and by adding axially aligned micro-grooves grooves on the exterior Surface of the envelope to allow boundary lubrication via water entry to points of contact with adjacent surfaces.

One of skilled in the art will realize that other low friction particulates could be substituted for the TEFLON particles suggested by way of example above. The "base" hose material could be another plastic or rubber material with suitable acoustic properties besides the TPU suggested. The low friction blended material could exist only as a thin outer surface layer of an acoustic hose with the remainder of the envelope material being of other suitable material.

Obviously, numerous modifications and variations of the present invention are possible in light of the above description. It is therefore to be understood that within the scope of the appended claims the invention may be practiced otherwise than as has been specifically described.

What is claimed is:

1. A method of fabricating an acoustic envelope for towed sonar arrays comprising:

forming an acoustic envelope material by mixing a base material and a low friction particulate material having lower friction characteristics than said base material, wherein said particulate material comprises particles having an average particle size of 8–15 microns; and forming said acoustic envelope material into an envelop having a longitudinal axis and an outer surface in which grooves are formed substantially in alignment with said longitudinal axis, wherein said grooves are formed substantially uniformly across said outer surface by an abrasive having a sandpaper coarseness between approximately 150 and approximately 400 grit.

2. The method according to claim 1 wherein said particulate material comprises particles of polytetraflouroethylene.

3. The method of claim 2 wherein said base material comprises thermoplastic polyurethane.

4. The method according to claim 3 wherein said particulate material comprises 5 to 20 parts by weight to 100 parts by weight of said base material.

5. An acoustic envelope for towed sonar arrays comprising:

a mix of a thermoplastic polyurethane base material and a low friction polytetraflouroethylene particulate material having lower friction characteristics that said base material, wherein said particulate material comprises particles having an average particle size of 8–15 microns and comprises 5 to 20 parts by weight to 100 parts by weight of said base material wherein said envelope has a longitudinal axis and an outer surface in which grooves are formed substantially in alignment with said longitudinal axis by sandpaper of a coarseness chosen between approximately 150 and approximately 400 grit.

6. An acoustic envelope for towed sonar arrays comprising:

an envelope material made of a mix of a base material and a low friction particulate material having lower friction characteristics that said base material, wherein said particulate material comprises particles having an average particle size of 8–15 microns, wherein said envelope has a longitudinal axis and an outer surface in which grooves are formed substantially in alignment with said longitudinal axis by sandpaper of a coarseness chosen between approximately 150 and approximately 400 grit.

7. The acoustic envelope according to claim 6 wherein said particulate material comprises particles of polytetraflouroethylene.

8. The acoustic envelope according to claim 7 wherein said base material comprises thermoplastic polyurethane.

9. The acoustic envelope according to claim 8 wherein said particulate filler material comprises 5 to 20 parts by weight to 100 parts by weight of said base material.

10. A method for fabricating an acoustic envelope for towed sonar arrays comprising the steps of:

providing a blend of a base material and a low friction particulate material having lower friction characteristics that said base material, said particulate material comprising particles having an average particle size of 8–15 microns;

heat extruding said blend into a first heat extruded form;

separating said first heat extruded form into a plurality of pellets;

heat extruding said pellets into an acoustic envelope of desired dimensions;

forming grooves in an outer surface of said acoustic envelope in substantial alignment with a longitudinal axis of said envelope, wherein said particulate material lies beneath said outside surface of said envelope without said grooves present and wherein some of said particulate material is uncovered by said grooves to expose them at said outside surface of said envelope.

11. The method according to claim 10 wherein said grooves are formed substantially uniformly across said outer surface by an abrasive having a sandpaper coarseness between approximately 150 and approximately 400 grit.

12. The method of claim wherein said particulate filler material comprises particles of polytetraflouroethylene.

13. The method of claim 12 wherein said base material comprises thermoplastic polyurethane.

14. The method of claim 13 wherein said particulate filler material comprises 5 to 20 parts by weight to 100 parts by weight of said base material.

* * * * *